US012754821B1

(12) United States Patent
Rimchala et al.

(10) Patent No.: US 12,754,821 B1
(45) Date of Patent: Oct. 6, 2026

(54) DUAL-CAPACITY MACHINE LEARNING BASED VALIDATION FRAMEWORK

(71) Applicant: Intuit Inc., Mountain View, CA (US)

(72) Inventors: Tharathorn Rimchala, San Francisco, CA (US); Miguel Garcia, San Diego, CA (US); Preeti Duraipandian, Plano, TX (US); Sakshi Singla, Mountain View, CA (US); Sungjae Kim, Plano, TX (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/437,202

(22) Filed: Dec. 30, 2025

(51) Int. Cl.

| | |
|---|---|
| ***G06F 16/2452*** | (2019.01) |
| ***G06F 11/3604*** | (2025.01) |
| ***G06F 16/21*** | (2019.01) |
| ***G06F 40/40*** | (2020.01) |
| ***G06N 3/084*** | (2023.01) |

(52) U.S. Cl.
CPC .................................. *G06F 11/3608* (2013.01)

(58) Field of Classification Search
CPC ............... G06F 11/3608; G06F 11/008; G06F 11/3688; G06F 11/3692; G06F 11/3696; G06F 8/41; G06F 16/24535; G06F 11/3409; G06F 16/24528; G06F 16/243; G06F 16/24522; G06F 21/53; G06F 21/577; G06F 8/30; G06F 8/35; G06F 8/36; G06F 16/24542; G06F 21/6227; G06F 16/245; G06F 16/2452; G06F 16/252; G06F 21/6218; G06F 21/554; G06N 20/00; G06N 3/0455; G06N 3/084; G06N 3/0475; G06N 3/08
See application file for complete search history.

(56) References Cited

U.S. PATENT DOCUMENTS

| | | | | |
|---|---|---|---|---|
| 12,561,473 B1 * | 2/2026 | So et al. | ............. | G06F 21/6227 |
| 12,632,447 B1 * | 5/2026 | Samad | .................. | G06F 16/243 |
| 12,645,672 B2 * | 6/2026 | Luo | ................... | G06F 16/24522 |

OTHER PUBLICATIONS

Hong et al., Knowledge-to-SQL: Enhancing SQL Generation with Data Expert LLM, 12 pages (Year: 2024).*
Emani et al., Horizon: Robust Checks for SQL Migration Using LLMs, 4 pages (Year: 2025).*
Fu, X., et al., "PREF: Reference-Free Evaluation of Personalised Text Generation in LLMs", Aug. 8, 2025, 9 pages.

* cited by examiner

*Primary Examiner* — Thuy Dao
(74) *Attorney, Agent, or Firm* — Lathrop GPM LLP

(57) ABSTRACT

A method for automatically evaluating code using a dual-capacity machine learning based validation framework. A target code generated by a code generator and ground truth code are received by the validation framework. A large language model is prompted, by the validation framework, with the target code, the ground truth code, and instructions to evaluate the target code by performing operations. The operations include segmenting the target code into a plurality of target code chunks and the ground truth code into a plurality of ground truth code chunks and mapping each target code chunk to corresponding ground truth code chunks. The operations also include evaluating each mapped target code chunk based on the corresponding ground truth code chunk to yield a plurality of scores. The operations also include determining a metric for the target code based on the plurality of scores.

20 Claims, 7 Drawing Sheets

DUAL-CAPACITY MACHINE LEARNING BASED VALIDATION FRAMEWORK

BACKGROUND

Code generators, such as artificial intelligence (AI) code generators, use machine learning (ML) to write code based on user instructions to the code generator to generate the code. Code generators may be used to aid a developer in writing code in a new language, streamline development of a software, or debug existing code.

In at least one application, code generators may be used to write Structured Query Language (SQL) code and object-oriented code for the purpose of onboarding new data from an entity to a reporting data layer. More specifically, the reporting data layer uses normalized data for reporting and analytics. Thus, the SQL code and the object-oriented code for onboarding new data must be executable, accurate and aligned with the standards and requirements of the reporting data layer.

Conventional evaluation for accuracy of the generated code prior to onboarding the generated code is a time-intensive process that requires manual review of the generated code by human domain experts. The process further involves manual writing of unit tests, functional tests, integration tests, and parity checks to evaluate the implemented code (manually or by AI) and detect potential errors before running the code against enterprise data to ensure no data losses or data corruption. Such manual process becomes a bottleneck when generated code from hundreds of entities are in queue for evaluation as the process can take upwards of twenty-five days to complete for each entity.

Thus, a technical problem exists, specifically to improve and streamline evaluation of generated SQL code and object-oriented code using, for example, a validation framework for evaluating code using a ground truth (GT)-based evaluation or a GT-free evaluation.

SUMMARY

One or more embodiments provides for a method for automatically evaluating code using a dual-capacity machine learning based validation framework. The method includes receiving, by a validation framework, structured query language (SQL) target code generated by a SQL code generator. The method also includes receiving, by the validation framework, ground truth SQL code. The method also includes prompting, by the validation framework, a large language model with the SQL target code, the ground truth SQL code, and instructions to evaluate the SQL target code by performing operations. The operations include segmenting the SQL target code into a plurality of SQL target code chunks and the ground truth SQL code into a plurality of ground truth SQL code chunks. The operations also include mapping each SQL target code chunk of the plurality of SQL target code chunks to corresponding ground truth SQL code chunks of the plurality of ground truth SQL code chunks. The operations also include evaluating each mapped SQL target code chunk of the plurality of SQL target code chunks based on the corresponding ground truth SQL code chunk of the plurality of ground truth SQL code chunks to yield a plurality of SQL scores. The operations also include determining a SQL metric for the SQL target code based on the plurality of SQL scores. The large language model, when prompted, performs the operations to output the SQL metric.

One or more embodiments provides for a method for automatically evaluating code using a dual-capacity machine learning based validation framework. The method includes receiving, by a validation framework, target code generated by a code generator. The method also includes receiving, by the validation framework, contextual information comprising at least a plurality of evaluation criteria and a reference evaluation. The method also includes prompting by the validation framework, a large language model with the target code, the contextual information, the reference evaluation, and instructions to evaluate the target code. The operations include segmenting the target code into a plurality of target code chunks. The operations also include evaluating each target code chunk of the plurality of target code chunks using a corresponding evaluation criteria of the plurality of evaluation criteria and the reference evaluation to yield a score of a plurality of scores. The operations also include generating feedback for each target code chunk of the plurality of code chunks. The operations also include determining a metric for the target code based on the plurality of scores. The large language model, when prompted, performs the operations to output the metric and the feedback. The method also includes displaying, by the validation framework, the feedback for each target code chunk when the metric is less than a predetermined threshold.

One or more embodiments provides for a method for automatically evaluating code using a dual-capacity machine learning based validation framework. The method includes receiving, by a validation framework, object-oriented target code generated by an object-oriented code generator. The method also includes receiving, by the validation framework, ground truth object-oriented code. The method also includes prompting a large language model with the object-oriented target code, the ground truth object-oriented code, and instructions to evaluate the object-oriented target code by performing operations. The operations include segmenting the object-oriented target code into a plurality of object-oriented target code chunks and the ground truth object-oriented code into a plurality of ground truth object-oriented code chunks. The operations also include mapping each object-oriented target code chunk of the plurality of object-oriented target code chunks to corresponding ground truth object-oriented code chunks of the plurality of ground truth object-oriented code chunks. The operations also include evaluating each mapped object-oriented target code chunk of the plurality of object-oriented target code chunks based on the corresponding ground truth object-oriented code chunk of the plurality of ground truth object-oriented code chunks to yield an object-oriented score of a plurality of object-oriented scores. The operations also include determining an object-oriented metric for the object-oriented target code based on the plurality of object-oriented scores. The large language model, when prompted, performs the operations to output the object-oriented metric.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1:
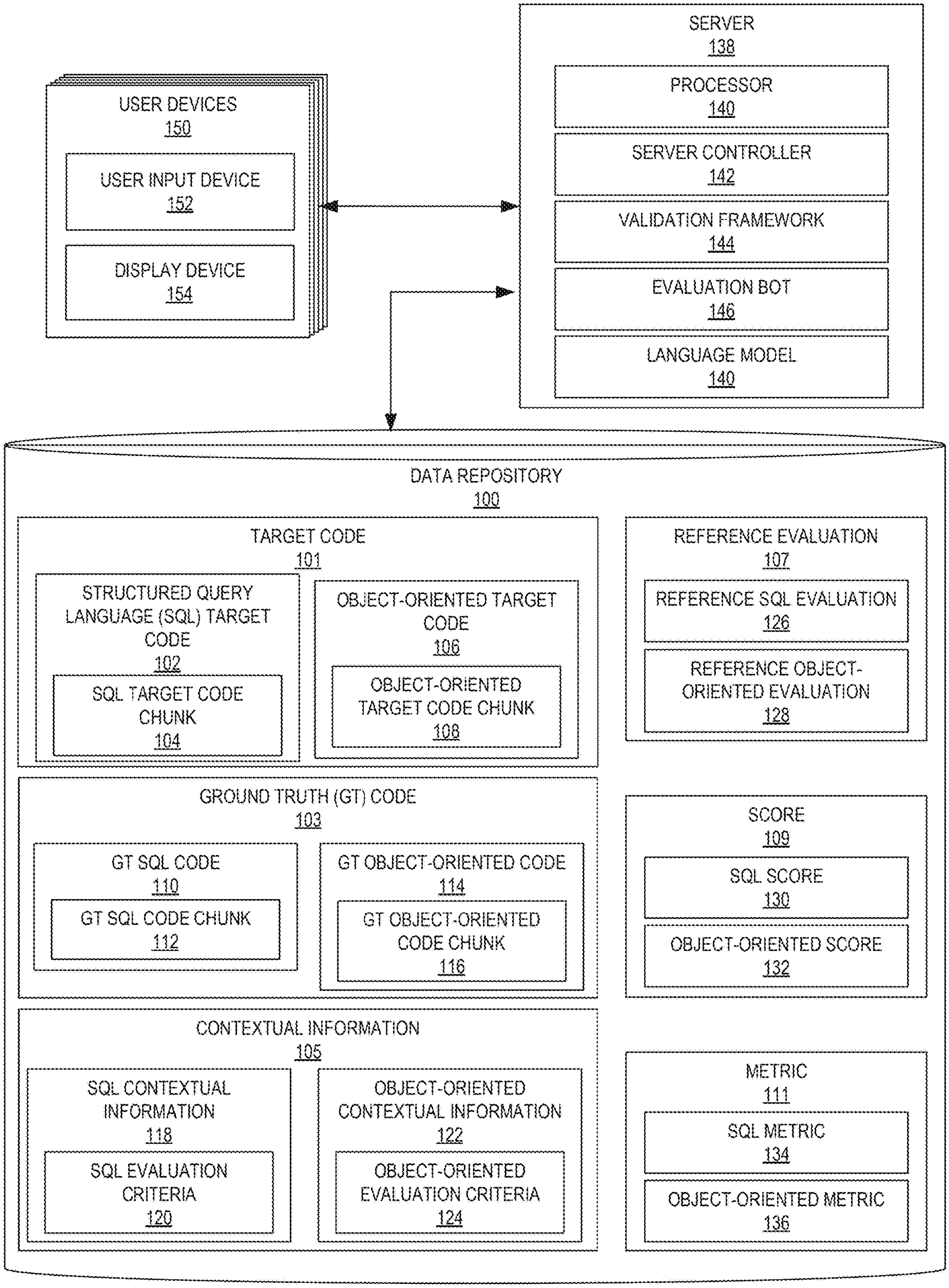
FIG. 1 shows a computing system, in accordance with one or more embodiments.

One or more embodiments are directed to a dual capacity machine learning based validation framework for automatically assessing and evaluating code. The validation framework evaluates the target code using a ground truth (GT) based evaluation when GT code is available, or a GT-free evaluation when the GT code is unavailable. Such dual-capability of the validation framework beneficially enables evaluation of generated code with or without GT code.

When using the GT-based evaluation, the validation framework prompts a large language model with the target code, the GT code, and instructions to evaluate the target code based on the GT code by performing multiple operations. The operations include, for example, segmenting or separating the target code into smaller chunks of code called target code chunks and the GT code into smaller chunks of GT code called GT code chunks.

The operations also include mapping the target code chunks to corresponding GT code chunks based on predefined parameters or elements (for object-oriented code) or corresponding tables and attributes (for SQL code) for each target code chunk. In other words, the target code chunks are matched to corresponding GT code chunks based on matching commands, code, attributes, tables, or the like. For example, a target code chunk with one or more import statements will be mapped to a GT code chunk with one or more corresponding import statements.

The operations also include evaluating the target code chunk based on the GT code chunk to yield one or more scores for each target code chunk and determining one or more metrics based on the scores. Scoring the target code chunk includes comparing the target code chunk to the GT code chunk and scoring the comparison. For example, a target code chunk with missing lines may be scored less than 100% to indicate that the target code chunk is not accurate compared to the GT code chunk.

The scores can be used to determine one or more metrics for the target code as a whole. For example, the metrics may include determining a code accuracy of the target code based on the scores of each target code chunk. If all code chunks are scored at, for example, 100% (out of 100%), then the target code accuracy is 100%. If some of the target code chunks are scored less than 100%, then the target code accuracy would also be less than 100%, indicating that the target code contains errors. If the one or more metrics are each above a predetermined threshold, then the target code is validated.

The instructions can include further instructions for outputting the metrics and an analysis report that includes the scores on a chunk-by-chunk or line-by-line basis of the target code via, for example, a user device. The analysis report and the metrics can be used by a user for further evaluation or modification to the target code to, for example, correct errors in the target code as flagged by the analysis report.

When using the GT-free evaluation, the validation framework prompts the large language model with the target code, contextual information including one or more evaluation criteria, a reference evaluation of a previously generated code including the previously generated code and the contextual information used to generate the code, and instructions to evaluate the target code by performing multiple operations. The operations include, for example, segmenting or separating the target code into smaller chunks of target code chunks.

The operations also include evaluating each target code chunk based on a corresponding evaluation criteria and corresponding code chunk of the previously generated code to yield one or more scores for each target code chunk. Scoring the target code chunk includes determining if the target code chunk meets the corresponding evaluation criteria. For example, if the evaluation criteria includes that a target code chunk for an import command includes two lines of code, a number of code lines in the target code chunk is counted to determine if the target code chunk has two lines of code. In the same example, if the target code chunk does not have two lines of code, then the target code chunk is given a score less than 100% indicating that the target code chunk is not accurate. The operations also include determining one or more metrics based on the scores and may be similarly performed as described above.

The operations also include generating feedback for each target code chunk and displaying such feedback on a chunk-by-chunk or line-by-line basis when the score for the corresponding code chunk is less than a predetermined threshold (e.g., 100%) via a user device. In other words, the feedback may only be shown to a user for code that has a score less than the predetermined threshold to provide targeted feedback. Such targeted feedback enables a user to quickly correct errors in the target code on a line-by-line basis with suggestions to correct the errors provided in the feedback in contrast to conventional methods where the target code is manually evaluated line-by-line.

One or more embodiments provide a practical application as a solution to the technical problem by providing a dual capacity (GT-based and GT-free) machine learning based validation framework for automatically assessing and evaluating target code. Thus, validation and evaluation of the target code is streamlined and improved and efficiency in onboarding the target code is increased.

Attention is now turned to the figures. FIG. 1 shows a computing system, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) stores target code (101). The target code (101) is a set of instructions written in a programming language that a computer reads and executes. The target code (101) is generated by and received from a code generator that can generate code in a target programming language. Alternatively, the target code (101) can be user-generated code.

In some embodiments, the target code (101) is SQL target code (102). The SQL target code (102) is written in a programming language for storing, processing, accessing, or manipulating data in databases such as, for example, relational databases. The SQL target code (102) can be programmed to, for example, create schema(s) for database(s). The SQL target code (102) includes mentioning of table(s) and each table includes attribute(s). During evaluation, which will be described in detail in FIGS. 2A, 2B, 3A, and 3B, the SQL target code (102) is segmented into SQL target code chunks (104) based on the mentioning of the tables in the SQL target code (102).

In other embodiments, the target code (101) is object-oriented target code (106). The object-oriented target code (106) is written in a programming language that uses classes and objects. Examples of object-oriented target code (106) include object-oriented code, such as written in the JAVA® programming language, C++ programming language, C#programming language, PYTHON® programming language, etc. The object-oriented target code (106) can be programmed for, for example, data extraction, transformation, or loading (ETL). During evaluation, which will be described in detail in FIGS. 2A, 2B, 3A, and 3B, the object-oriented target code (106) is segmented into object-oriented target code chunks (108).

The data repository (100) also stores GT code (103). The GT code (103) is code written by a user and used as verified and accurate code to train a language model (140) (described further below). In other words, the GT code (103) represents code that is accurately written, has been thoroughly tested and contains no errors. The GT code (103) is used to evaluate the target code (101) during a GT-based evaluation.

In some embodiments, the GT code (103) is GT SQL code (110). The GT SQL code (110) is the GT code (103) written in the SQL language. The GT SQL code (110) is accurately written to, for example, create schema(s) for database(s). During evaluation, which will be described in detail in FIGS. 2A, 2B, 3A, and 3B, the GT SQL code (110) is segmented into GT SQL code chunks (112) and is used to evaluate corresponding SQL target code chunks (104).

In other embodiments, the GT code (103) is GT object-oriented code (114). The GT object-oriented code (114) is the GT code (103) written in the object-oriented language. The GT object-oriented code (110) is accurately programmed for, for example, performing data transformation. During evaluation, which will be described in detail in FIGS. 2A, 2B, 3A, and 3B, the GT object-oriented code (114) is segmented into GT object-oriented code chunks (116) and is used to evaluate corresponding object-oriented target code chunks (108).

The data repository (100) also stores contextual information (105). The contextual information (105) is context about the target code (101) provided to the language model (140) before the language model (140) generates a response.

In some embodiments, the contextual information (105) is SQL contextual information (118), which includes SQL evaluation criteria (120) for evaluating the SQL target code (102). The SQL evaluation criteria (120) can include, for example, a number of mismatched lines, a number of missed lines, a number of hallucinated lines, etc. The SQL evaluation criteria (120) can be user generated or automatically generated.

In other embodiments, the contextual information (105) is object-oriented contextual information (122), which includes object-oriented evaluation criteria (124) for evaluating the object-oriented target code (106). The object-oriented evaluation criteria (124) can also include, for example, a number of mismatched lines, a number of missed lines, a number of hallucinated lines, etc. The object-oriented evaluation criteria (124) can be user generated or automatically generated.

The data repository (100) also stores a reference evaluation (107). The reference evaluation (107) is an evaluation for a code that was previously generated by a user or a code generator. The reference evaluation (107) can include, for example, scores, metrics, or feedback for the prior-generated code. The reference evaluation (107) may include corresponding contextual information used to generate the previously generated code and the previously generated code itself. The reference evaluation (107) can be user generated or automatically generated.

In some embodiments the reference evaluation (107) is reference SQL evaluation (126) that, along with the SQL contextual information (118) can be used to evaluate the SQL target code (102). The reference SQL evaluation (126) may include, for example, a set of example previously generated SQL code and evaluation of the SQL code pairs. In other embodiments, the reference evaluation (107) is a reference object-oriented evaluation (128) that, along with the object-oriented contextual information (122) can be used to evaluate the object-oriented target code (106).

The reference evaluation (107) and the contextual information (105) are used to evaluate the target code (101) during a GT-free evaluation. In other words, the reference evaluation (107) and the contextual information (105) are used to evaluate the target code (101) when the GT code (103) is not available, as is discussed in more detail in FIGS. 2B and 3B.

The data repository (100) also stores score(s) (109). The score(s) (109) are based on results of evaluating the target code (101) using the GT code (103) in a GT-based evaluation or the contextual information (105) and the reference evaluation (107) in a GT-free evaluation. The scores (109) can be numeric-based (e.g., 0, 1, 2, etc.), text-based (e.g., "true" or "false"), or a combination of numeric-based and text-based. For example, the target code (101) can be evaluated for whether a specific attribute in the target code (101) is the correct datatype as defined by the GT code (103) or the contextual information (105) and the reference evaluation (107) and the score (109) can be "FALSE" when the attribute is not the correct datatype.

The target code (101) can be scored chunk by chunk. More specifically, SQL scores (130) are the result of evaluating the SQL target code chunks (104) using the corresponding GT SQL code chunks (112) or the SQL evaluation criteria (120) and the reference SQL evaluation (126). Similarly, object-oriented scores (132) are the result of evaluating the object-oriented target code chunks (108) using the corresponding GT object-oriented code chunks (116) or the object-oriented evaluation criteria (124) and the reference object-oriented evaluation (128).

The data repository (100) also stores metric(s) (111). The metrics (111) are based on the scores (109) of each chunk of the target code (101) and correspond to an evaluation of the target code (101) as a whole. The metrics (111) can be provided as, for example, structured data or a data-structure object. The metrics (111) can be SQL metrics (134) corresponding to the SQL target code (102) or object-oriented metrics (136) corresponding to the object-oriented target code (106).

More specifically, the SQL metrics (134) can include one or more of a code accuracy that measures a proportion of correctly generated field in the SQL target code (102); a code coverage that measures how many of the required fields were successfully generated in the SQL target code (102); a primary key accuracy that measure a correctness of primary key definitions in the SQL target code (102); and a data type accuracy metric that measures a correctness of data type assignments for all required fields in the SQL target code (102). Similarly, the object-oriented metrics (136) can include one or more of a code accuracy that measures a proportion of correctly generated field in the object-oriented target code (106); a field-mapping accuracy that measures how many of fields across code-blocks were accurately mapped in the object-oriented target code (106); and a data type accuracy metric that measures a correctness of data type assignments for all required fields in the object-oriented target code (106).

The system shown in FIG. 1 may include other components. For example, the system shown in FIG. 1 also may include a server (138). The server (138) is one or more computer processors, data repositories, communication devices, and supporting hardware and software. The server (138) may be in a distributed computing environment. The server (138) is configured to execute one or more applications, such as the validation framework (144), an evaluation bot (146), and a language model (140). An example of a computer system and network that may form the server (138) is described with respect to FIG. 5A and FIG. 5B.

The server (138) includes a computer processor (140). The computer processor (140) is one or more hardware or virtual processors which may execute computer readable program code that defines one or more applications, such as the validation framework (144), the evaluation bot (146), and the language model (140). An example of the computer processor (140) is described with respect to the computer processor(s) (502) of FIG. 5A.

The server (138) also includes the validation framework (144). The validation framework (144) is software or application specific hardware which, when executed by the computer processor (140), essentially performs the methods of FIGS. 2A, 2B, 3A, and 3B. An example of a dataflow and structure of the validation framework (144) is shown in FIG. 4. Thus, the validation framework (144) may include the language model (140). However, the validation framework (144) is shown separately from the language model (134) in the example of FIG. 1, because different architectural arrangements of the language model (140) and the validation framework (144) are possible.

The server (138) also includes the evaluation bot (146). The evaluation bot (146) is software or application specific hardware which, when executed by the computer processor (140), executes the validation framework (144) to evaluate the target code (101) via a GT-based evaluation using the GT code (103) or a GT-free evaluation using the contextual information (105) and the reference evaluation (107) to generate the scores (109) for chunk-level code, the corresponding metrics (111) for the target code (101), and the feedback that will be surface to the user display device (154).

The evaluation bot (146) further determines if any chunk-level code has an accuracy or score (109) less than a predetermined threshold and displays feedback for each chunk-level or attribute-level code that has a score (109) less than the predetermined threshold. The feedback can be obtained from the language model (140) and includes an explanation for why the chunk-level code has a score (109) less than the predetermined threshold and suggestions for fixing or correcting the chunk-level code.

The server (138) also includes a language model (140). The language model (140) is a natural language processing machine learning model. An example of the language model (140) may be a large language model, such as CHATGPT® language model (e.g., GPT-4o language model, GPT-4.1 language model, etc.). However, many different language models may be used. Use of the language model (140) within or with the validation framework (144) is described with respect to FIGS. 2A, 2B, 3A, 3B, and 4.

The server (142) also may include a server controller (142). The server controller (142) is software or application specific hardware which, when executed by the computer processor (140), controls and coordinates operation of the software or application specific hardware described herein. Thus, the server controller (142) may control and coordinate execution of the validation framework (144), the evaluation bot (146), and the language model (140).

The system shown in FIG. 1 also may include one or more user devices (150). The user devices (150) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

Figure 5A:
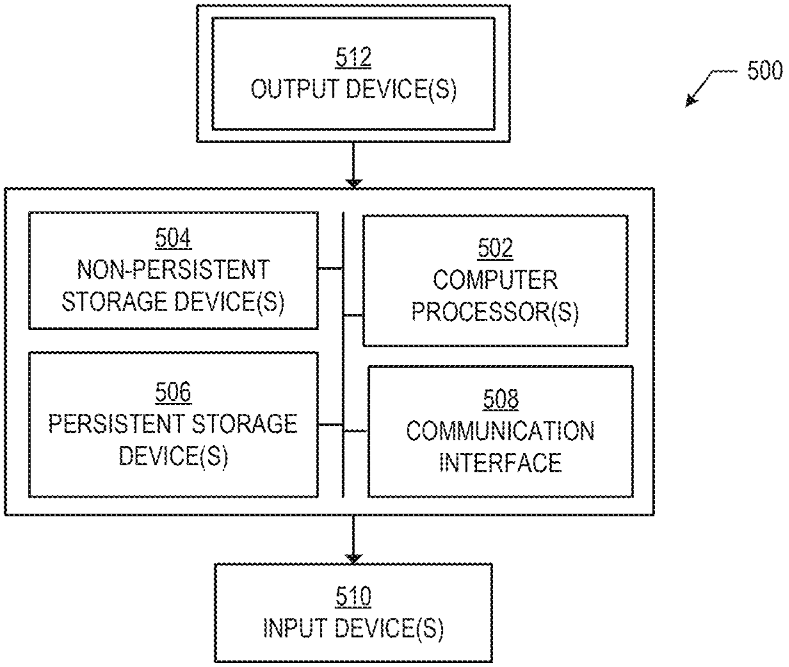
FIG. 5A and FIG. 5B show an example of a computing system and network environment, in accordance with one or more embodiments.

In any case, the user devices (150) are computing systems (e.g., the computing system (500) shown in FIG. 5A) that communicate with the server (138). A prompt to evaluate the target code (101) using the GT code (103) or the contextual information (105) and the reference evaluation (107) may be received via the user devices (150), or an automated process. In another embodiment, one or more of the user devices (150) may be operated by a computer technician that services the various components of the system shown in FIG. 1.

While FIG. 1 shows a configuration of components, other configurations may be used without departing from the scope of one or more embodiments. For example, various components may be combined to create a single component. As another example, the functionality performed by a single component may be performed by two or more components.

Turning to FIGS. 2A, 2B, 3A, and 3B, flowcharts will be shown and described in detail below. The method of FIGS. 2A, 2B, 3A, and 3B may be implemented using the system of FIG. 1 and one or more of the steps may be performed on or received at one or more computer processors. Further, while the various steps in the flowcharts of FIGS. 2A, 2B, 3A, and 3B below are presented and described sequentially, at least some of the steps may be executed in different orders, may be combined or omitted, and at least some of the steps may be executed in parallel. Furthermore, the steps may be performed actively or passively.

Figure 2A:
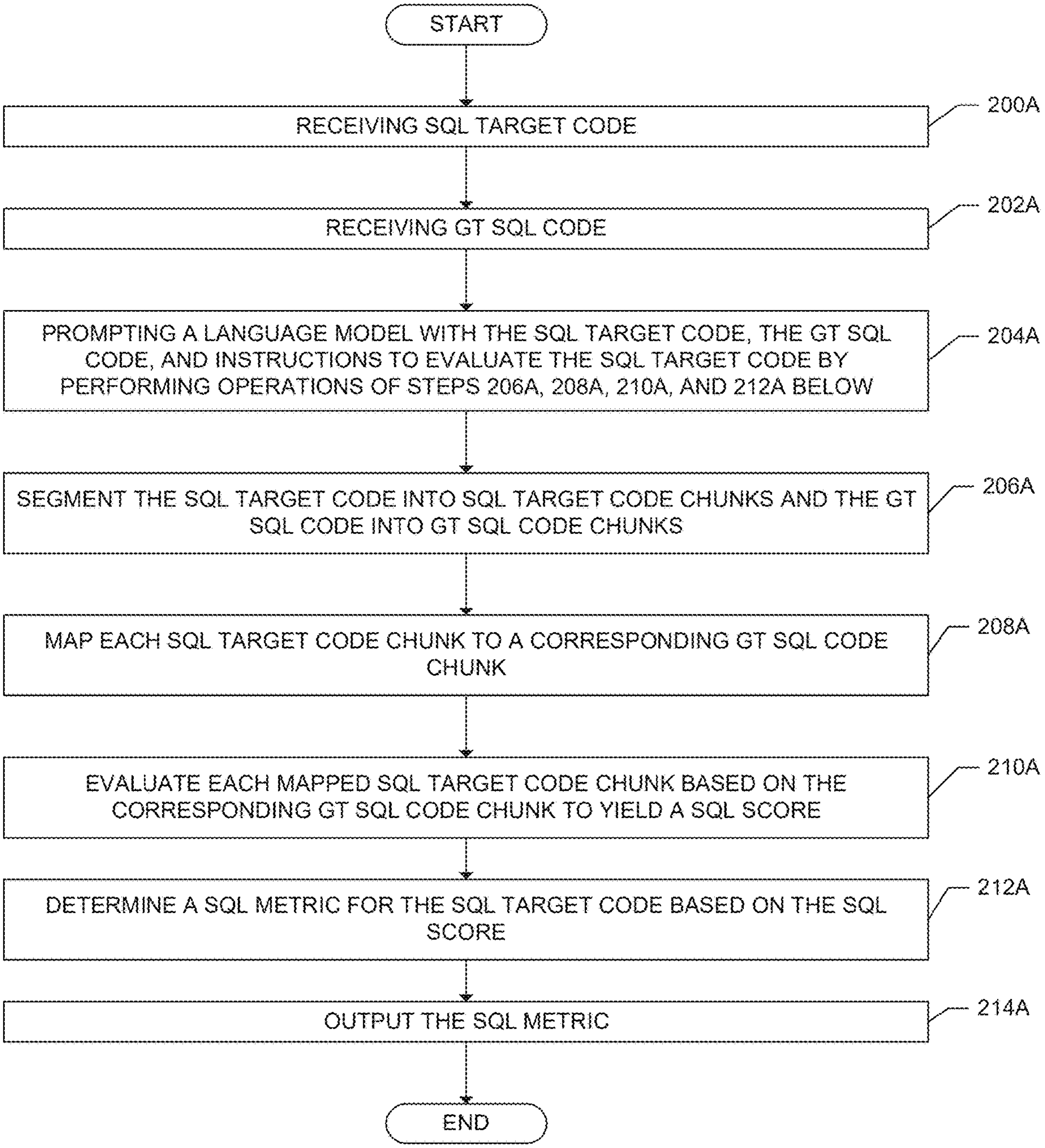
FIG. 2A shows a flowchart of a method for evaluating structured query language (SQL) code using a ground truth (GT)-based evaluation, in accordance with one or more embodiments.

Turning to FIG. 2A, a flowchart of a method for evaluating SQL code using a GT-based evaluation is shown, in accordance with one or more embodiments.

The step 200A includes receiving SQL target code by a validation framework. The SQL target code may be received from a code generator that generates SQL target code or from a data repository where the SQL target code is stored. In other embodiments, the SQL target code may be user-generated code and received from the data repository or from a user device. In some embodiments, receiving the SQL target code includes receiving a location of the SQL target code (e.g., a generated SQL target code path) for retrieval of the SQL target code from a stored location.

The step 202A includes receiving GT SQL code by the validation framework. The GT SQL code may be received from a user device or a data repository where the GT SQL code is stored. As previously described, the GT SQL code is user-generated and is used to evaluate the SQL code received in the step 200A. In some embodiments, receiving the GT SQL code includes receiving a location of the GT SQL code (e.g., a GT SQL code path) for retrieval of the GT SQL code from a stored location.

The step 204A includes prompting, by the validation framework, a language model with the SQL target code, the GT SQL code and instructions to evaluate the SQL target code by performing the operations of steps 206A, 208A, 210A, and 212A, described below. In some embodiments, the language model may also be prompted with a mapping file that contains accurate mapping between tables and attributes of the SQL code and the GT SQL code.

The step 206A includes segmenting the SQL target code into SQL target code chunks and the GT SQL code into GT SQL code chunks. The instructions to evaluate the SQL target code may include instructions to segment the SQL target code into SQL target code chunks and the GT SQL code into GT SQL code chunks. In other embodiments, the instructions to segment the SQL target code and the GT SQL code may be provided separately from the instructions to evaluate the SQL target code.

The step 208A includes mapping each SQL target code chunk to a corresponding GT SQL code chunk. The instructions to evaluate the SQL target code may also include instructions to map each SQL target code chunk to the corresponding GT SQL code chunk. In embodiments where the language model is also prompted with the mapping file, fields in the mapping file may be filled in with the SQL target code chunks and the GT SQL code chunks. A field may be filled in based on a table and an attribute given in the field and the SQL target code chunk and the GT SQL code chunk with the same table and attribute.

In other embodiments, each SQL target code chunk may be mapped to the corresponding GT SQL code chunk based on matching tables, then matching attributes within each matched table. More specifically, the SQL target code chunk may be mapped to the corresponding GT SQL code chunk by mapping a table of the SQL target code chunk to a table of a corresponding GT SQL code chunk, then mapping attributes of each SQL target code chunk to attributes of the corresponding GT SQL code chunks, and finally mapping optionally additional clauses such as primary key and foreign constraint definitions.

The step 210A includes evaluating each mapped SQL target code chunk based on the corresponding GT SQL code chunk to yield one or more SQL scores. Evaluating each mapped SQL target code chunk includes, for example, comparing each mapped SQL target code chunk to the corresponding GT code chunk and scoring the comparison. Scoring the comparison can include, for example, determining whether the SQL target code chunk includes the correct number of lines, whether the SQL target code chunk is missing any lines, whether the SQL target code includes any hallucinated lines, whether a SQL target code chunk is missing, whether the attributes are assigned the correct datatype, etc. compared to the GT code chunk and providing a score based on the determinations. For example, if the SQL target code chunk is determined to be missing lines, then the SQL target code chunk may be scored below 100% such as, for example, 80%.

Alternatively, the one or more SQL scores can be determined using a rules-based algorithm that compares the SQL target code and the GT SQL code side-by-side. In such alternative, the comparison uses algorithms and logic to score the SQL target code based on the GT SQL code to generate the one or more SQL codes.

The step 212A includes determining one or more SQL metrics for the SQL target code based on the SQL score(s). As previously described, the SQL metrics are based on the SQL scores obtained from evaluating each mapped SQL target code chunk based on the corresponding GT SQL code chunk. The SQL metrics can include one or more of a code accuracy that measures a proportion of correctly generated fields in the SQL target code; a code coverage that measures how many of the required fields were successfully generated in the SQL target code; a primary key accuracy that measure a correctness of primary key definitions in the SQL target code; and a data type accuracy metric that measures a correctness of data type assignments for all required fields in the SQL target code.

The step 214A includes outputting the SQL metric(s) by the validation framework. The SQL metrics can be output to a user device for display to a user. Alternatively, the SQL metrics can be output to, for example, an open source developer platform such as an MLFLOW® developer platform. The user can use the SQL metrics to further evaluate the SQL target code and modify or correct errors in the SQL target code. In some embodiments, a SQL code analysis report may also be generated as output with the SQL metrics. The SQL code analysis report may include a table of each mapped SQL target code chunk, the corresponding mapped GT SQL code chunk, and a corresponding SQL score.

Figure 2B:
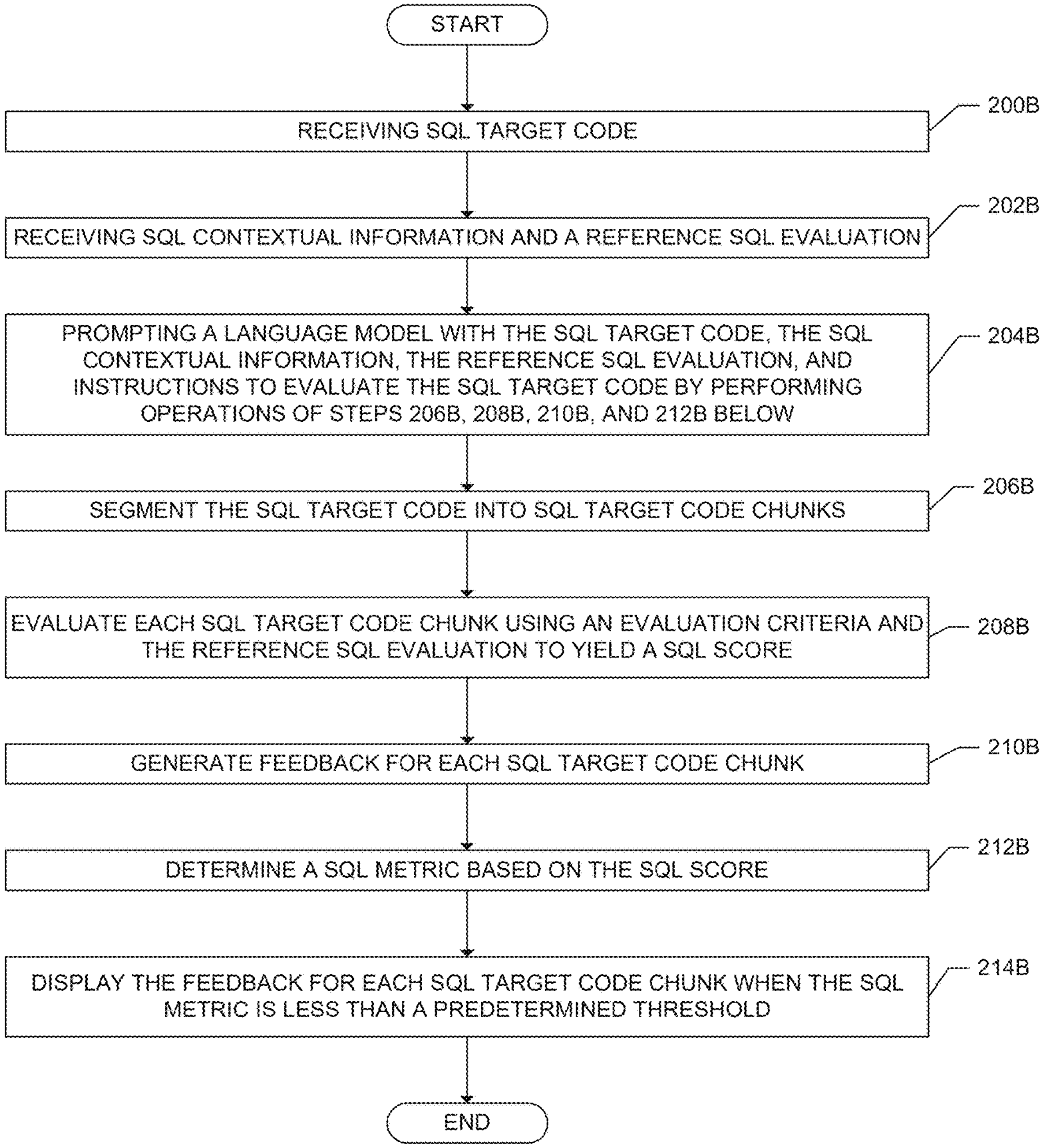
FIG. 2B shows a flowchart of a method for evaluating SQL code using a GT-free evaluation, in accordance with one or more embodiments.

FIG. 2B shows a flowchart of a method for evaluating SQL target code using a GT-free evaluation, in accordance with one or more embodiments.

The step 200B includes receiving SQL code by a validation framework. The step 200B is the same as or similar to the step 200A.

The step 202B includes receiving SQL contextual information and a reference SQL evaluation by the validation framework. The SQL contextual information and the reference SQL evaluation may be received from a user device or a data repository.

As previously described, the SQL contextual information includes SQL evaluation criteria for evaluating the SQL target code and the reference SQL evaluation is an evaluation of prior-generated SQL code (whether user-generated or generated by a code generator). The reference SQL evaluation can also include the prior-generated SQL code and the corresponding contextual information used to generate the prior-generated SQL code.

The step 204B includes prompting, by the validation framework, a language model with the SQL target code, the SQL contextual information, the reference SQL evaluation, and instructions to evaluate the SQL target code by performing the operations of steps 206B, 208B, 210B, and 212B, described below.

The step 206B includes segmenting the SQL target code into SQL target code chunks. In some embodiments, the contextual information includes predefined SQL target code chunk information. In such embodiments, the SQL target code is segmented into the SQL target code chunks based on the predefined SQL target code chunk information. For example, a SQL target code chunk information may include a target code chunk for user defined functions (UDFs). A portion of the SQL target code that includes the UDFs may be segmented into the corresponding SQL target code chunk.

The step 208B includes evaluating each SQL target code chunk using the SQL evaluation criteria and the reference SQL evaluation to yield one or more SQL score(s). As previously described, the SQL evaluation criteria can include, for example, a number of mismatched lines, a number of missed lines, a number of hallucinated lines, correct datatype, etc. The reference SQL evaluation (along with the corresponding contextual information and the prior-generated SQL code) is used by the language model as an example evaluation. Thus, each SQL target code chunk can be scored using the corresponding SQL evaluation criteria and then compared to the reference SQL evaluation and corresponding contextual information and prior-generated SQL code. The comparison of each SQL target code chunk to the reference SQL evaluation can be used to, for example, adjust the SQL score.

The step 210B includes generating feedback for each SQL target code chunk. The feedback includes an explanation for why the SQL target code chunk has a score less than a predetermined threshold (e.g., 100%) and suggestions for fixing or correcting the corresponding SQL target code chunk. For example, the feedback may include information about missing SQL target code chunks or missing lines in a SQL target code chunk. More specifically, the feedback also includes feedback metadata which specifies the line number and line position of the code such that the feedback can be anchor to the correct position for the user in the feedback user interface (e.g., a GIT® UI view). The feedback also includes the SQL target code.

The step 212B includes determining one or more SQL metrics for the SQL target code based on the SQL score(s). The step 212B is the same as or similar to the step 212A.

The step 214B includes displaying, by an evaluation bot, the feedback for each SQL target code chunk when the SQL metric is less than the predetermined threshold. The SQL target code chunk and the feedback may be displayed on, for example, a user device. In some embodiments, the feedback may be displayed line-by-line. Such display of the feedback based on a predetermined threshold may aid a user in quickly modifying or correcting errors directly at the line of SQL target code causing the error.

Figure 3A:
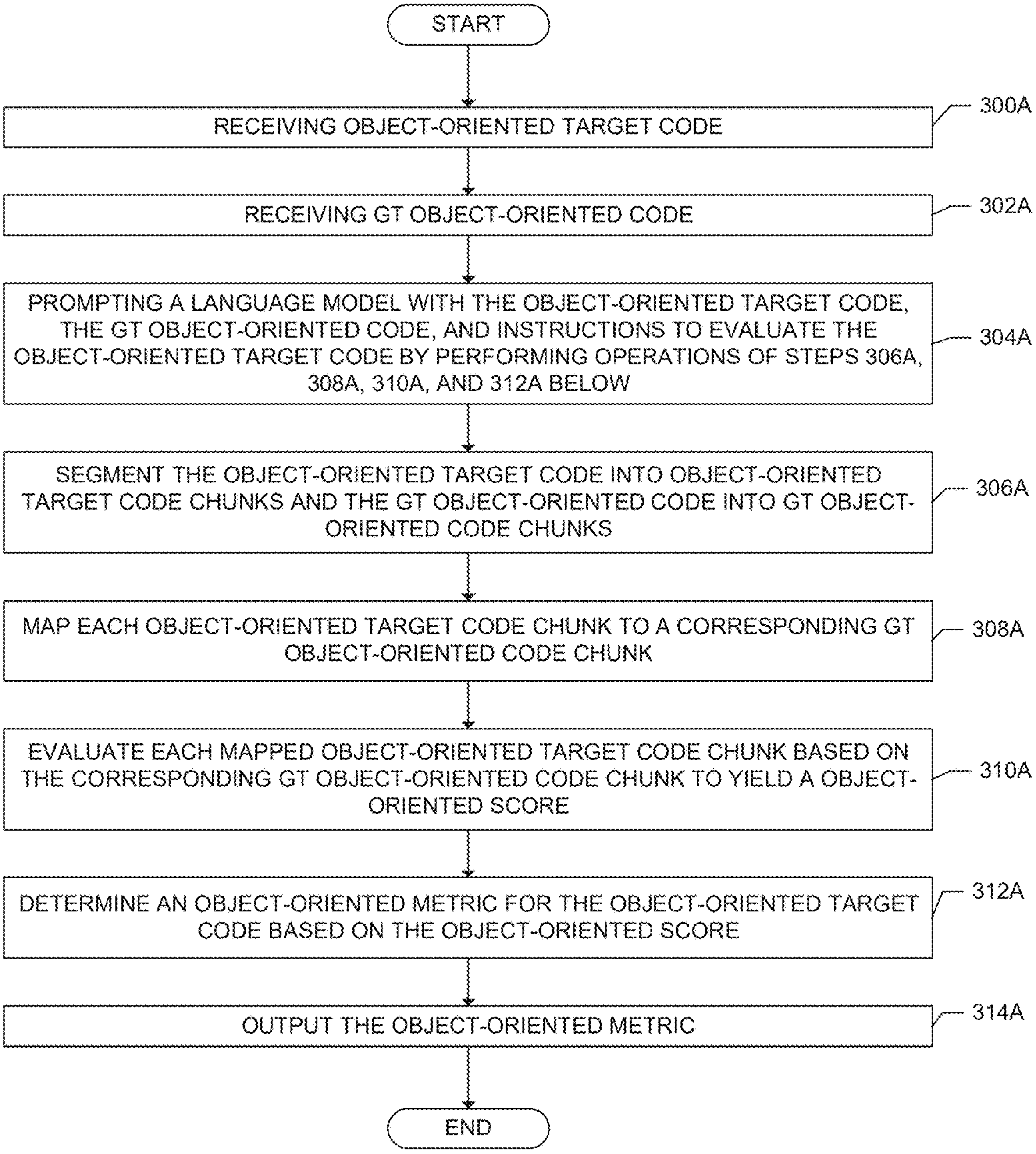
FIG. 3A shows a flowchart of a method for evaluating object-oriented code using a GT-based evaluation, in accordance with one or more embodiments.
Figure 4:
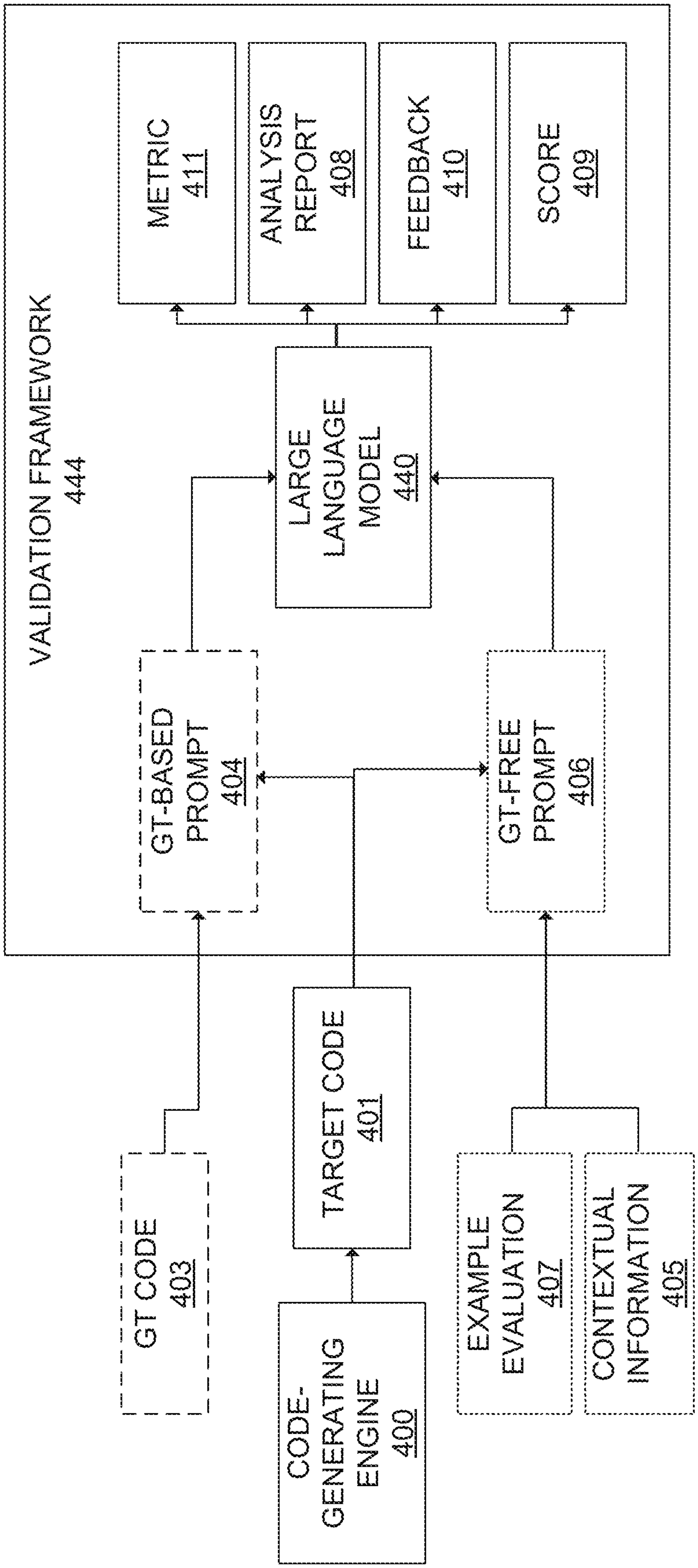
FIG. 4 shows an example dataflow of a validation framework that evaluates code using a GT-based evaluation or a GT-free evaluation, in accordance with one or more embodiments.

FIG. 3A shows a flowchart of a method for evaluating object-oriented target code using a GT-based evaluation, in accordance with one or more embodiments.

The step 300A includes receiving object-oriented target code by a validation framework. The object-oriented target code may be received from a code generator that generates object-oriented target code or from a data repository where the object-oriented target code is stored. In other embodiments, the object-oriented target code is user-generated code and received from the data repository or from a user device. In some embodiments, receiving the object-oriented target code includes receiving a location of the object-oriented target code (e.g., a generated object-oriented target code path) for retrieval of the object-oriented target code from a stored location.

The step 302A includes receiving GT object-oriented code by the validation framework. The GT object-oriented code may be received from a user device or a data repository where the GT object-oriented code is stored. As previously described, the GT object-oriented code is user-generated and is used to evaluate the object-oriented code received in the step 300A. In some embodiments, receiving the GT object-oriented code includes receiving a location of the GT object-oriented code (e.g., a GT object-oriented code path) for retrieval of the GT object-oriented code from a stored location.

The step 304A includes prompting, by the validation framework, a language model with the object-oriented target code, the GT object-oriented code and instructions to evaluate the object-oriented target code by performing the operations of steps 306A, 308A, 310A, and 312A, described below. In some embodiments, the language model may also be prompted with a mapping file that contains accurate mapping between code chunks of the object-oriented target code and the GT object-oriented code.

The step 306A includes segmenting the object-oriented target code into object-oriented target code chunks and the GT object-oriented code into GT object-oriented code chunks. The instructions to evaluate the object-oriented target code may include instructions to segment the object-oriented target code into object-oriented target code chunks and the GT object-oriented code into GT object-oriented code chunks. In other embodiments, the instructions to segment the object-oriented target code and the GT object-oriented code may be provided separately from the instructions to evaluate the object-oriented target code.

The step 308A includes mapping each object-oriented target code chunk to a corresponding GT object-oriented code chunk. The instructions to evaluate the object-oriented target code may also include instructions to map each object-oriented target code chunk to the corresponding GT object-oriented code chunk. In embodiments where the language model is also prompted with the mapping file, fields in the mapping file may be filled in with the object-oriented target code chunks and the GT object-oriented code chunks. A field may be filled in based on an expected code chunk given in the field and the object-oriented target code chunk and the GT object-oriented code chunk with the same attribute.

In embodiments where the language model is not prompted with the mapping file, the language model may be prompted with instructions to map the object-oriented target code chunk to a corresponding GT object-oriented code chunk based on matching elements. For example, the element may include package_declaration and the object-oriented target code chunk for package declaration may be mapped to the GT object-oriented code chunk for package declaration.

The step 310A includes evaluating each mapped object-oriented target code chunk based on the corresponding GT object-oriented code chunk to yield one or more object-oriented scores. Evaluating each mapped object-oriented target code chunk includes, for example, comparing each mapped object-oriented target code chunk to the corresponding GT code chunk and scoring the comparison. Scoring the comparison can include, for example, determining whether the object-oriented target code chunk includes the correct number of lines, whether the object-oriented target code chunk is missing any lines, whether the object-oriented target code includes any hallucinated lines, whether an object-oriented target code chunk is missing, etc. compared to the GT code chunk and providing a score based on the determinations. For example, if the object-oriented target code chunk is determined to be missing lines, then the object-oriented target code chunk may be scored below 100% such as, for example, 80%.

Alternatively, the one or more object-oriented scores can be determined using a rules-based algorithm that compares the object-oriented target code and the GT object-oriented code side-by-side. In such alternative, the comparison uses algorithms and logic to score the object-oriented target code based on the GT object-oriented code to generate the one or more SQL codes.

The step 312A includes determining one or more object-oriented metrics for the object-oriented target code based on the object-oriented score(s). As previously described, the object-oriented metrics are based on the object-oriented scores obtained from evaluating each mapped object-oriented target code chunk based on the corresponding GT object-oriented code chunk. The object-oriented metrics can include one or more of a code accuracy that measures a proportion of correctly generated functional statements in the object-oriented target code; a field-mapping accuracy that measures how many of fields across code-blocks were accurately mapped in the object-oriented target code; and a data type accuracy metric that measures a correctness of data type assignments for all required fields in the object-oriented target code.

The step 314A includes outputting the object-oriented metric(s) by the validation framework. The object-oriented metrics can be outputted to a user device for displaying to a user. The user can use the object-oriented metrics to further evaluate the object-oriented target code and modify or correct errors in the object-oriented target code. In some embodiments, an object-oriented code analysis report may also be outputted with the object-oriented metrics. The object-oriented code analysis report may include a table of each mapped object-oriented target code chunk, the corresponding mapped GT object-oriented code chunk, and a corresponding object-oriented score.

Figure 3B:
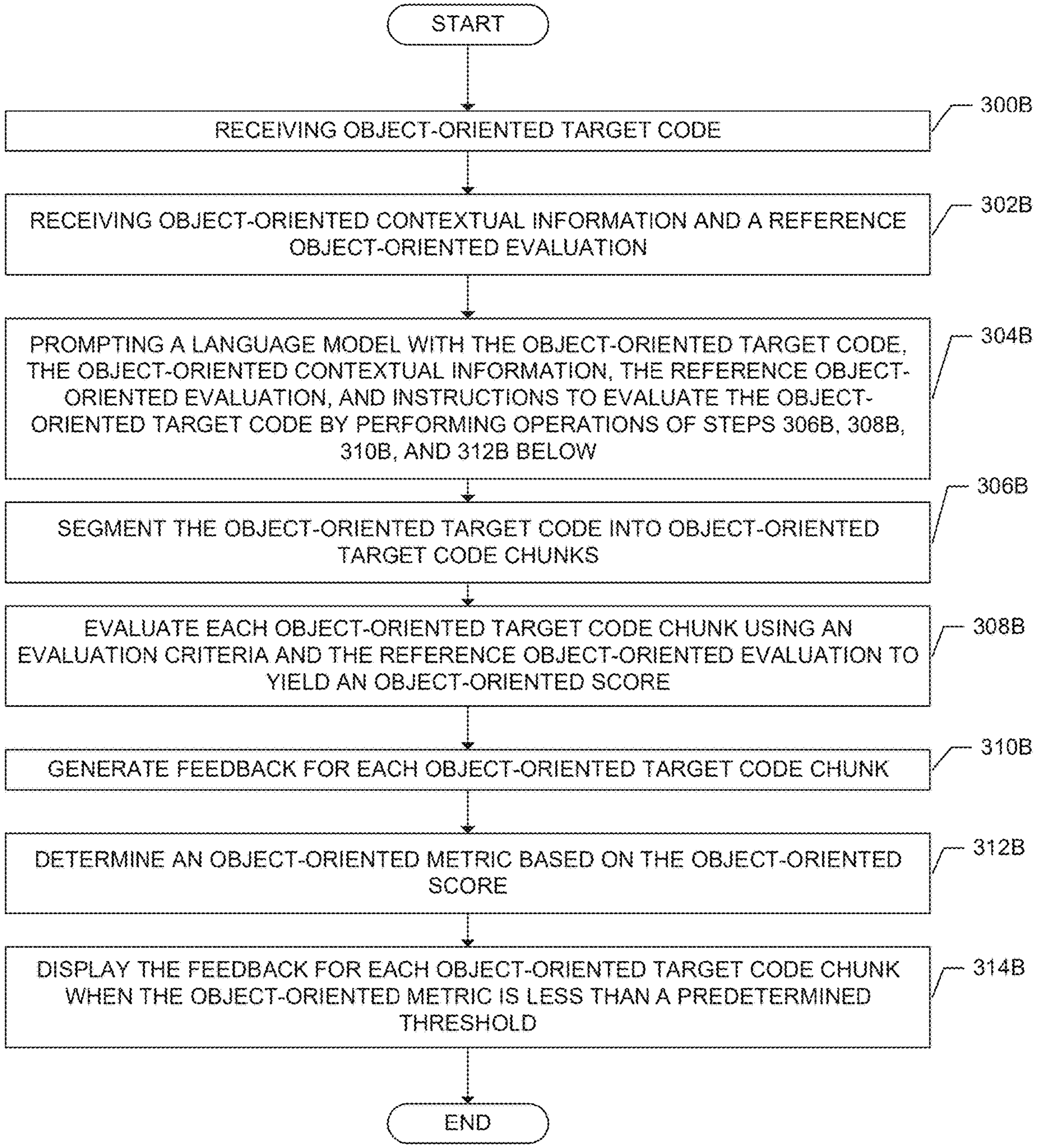
FIG. 3B shows a flowchart of a method for evaluating object-oriented code using a GT-free evaluation, in accordance with one or more embodiments.

FIG. 3B shows a flowchart of a method for evaluating object-oriented target code using a GT-free evaluation, in accordance with one or more embodiments.

The step 300B includes receiving object-oriented target code by a validation framework. The step 300B is the same as or similar to the step 300A.

The step 302B includes receiving object-oriented contextual information and a reference object-oriented evaluation by the validation framework. The object-oriented contextual information and the reference object-oriented evaluation code may be received from a user device or a data repository where the GT object-oriented target code is stored. As previously described, the object-oriented contextual information includes object-oriented evaluation criteria for evaluating the object-oriented target code and the reference object-oriented evaluation is an evaluation of a prior-generated object-oriented code (whether user-generated or generated by a code generator). The reference object-oriented evaluation also includes corresponding contextual information used to evaluate the prior-generated object-oriented code and the detailed scoring, explanation and proposed code fixes of the corresponding prior-generated object-oriented code.

The step 304B includes prompting, by the validation framework, a language model with the object-oriented target code, the object-oriented contextual information, the reference object-oriented evaluation, and instructions to evaluate the object-oriented target code by performing the operations of steps 306B, 308B, 310B, and 312B, described below.

The step 306B includes segmenting the object-oriented target code into object-oriented target code chunks. In some embodiments, the contextual information includes predefined object-oriented target code chunk information. In such embodiments, the object-oriented target code is segmented into the object-oriented target code chunks based on the predefined object-oriented target code chunk information. For example, an object-oriented target code chunk information may include a target code chunk for an import statement. A portion of the object-oriented target code that includes the import statement may be segmented into the corresponding object-oriented target code chunk.

The step 308B includes evaluating each object-oriented target code chunk using the object-oriented evaluation criteria and the reference object-oriented evaluation to yield one or more object-oriented score(s). As previously described, the object-oriented evaluation criteria can include, for example, a number of mismatched lines, a number of missed lines, a number of hallucinated lines, etc. The reference object-oriented evaluation along with the corresponding contextual information and the prior-generated object-oriented code is used by the language model as an example evaluation. Thus, each object-oriented target code chunk can be scored using the corresponding object-oriented evaluation criteria and then compared to the reference object-oriented evaluation (and in some instances, the corresponding evaluation details and prior-generated object-oriented code). The comparison of each object-oriented target code chunk to the reference object-oriented evaluation can be used to, for example, adjust the object-oriented score.

The step 310B includes generating feedback for each object-oriented target code chunk. The feedback includes an explanation for why the object-oriented target code chunk has a score less than a predetermined threshold (e.g., 100%) and suggestions for fixing or correcting the corresponding object-oriented target code chunk. For example, the feedback may include information about missing object-oriented target code chunks or missing lines in an object-oriented target code chunk. More specifically, the feedback also includes feedback metadata which specifies the line number and line position of the code such that the feedback can be anchor to the correct position for the user in the feedback user interface (e.g., a GIT® UI view). The feedback can also include the object-oriented target code.

The step 312B includes determining one or more object-oriented metrics for the object-oriented target code based on the object-oriented score(s). The step 312B is the same as or similar to the step 312A.

The step 314B includes displaying, by an evaluation bot, the feedback for each object-oriented target code chunk when the object-oriented metric is less than the predetermined threshold. The object-oriented target code chunk and the feedback may be displayed on, for example, a user device. In some embodiments, the feedback may be displayed line-by-line. As previously described, such display of the feedback may aid a user in quickly modifying or correcting errors directly at the line of object-oriented target code causing the error.

FIG. 4 shows an example dataflow of a validation framework that evaluates target code using a GT-based evaluation or a GT-free evaluation, in accordance with one or more embodiments. The following example is for explanatory purposes only and not intended to limit the scope of one or more embodiments.

As shown, a code generator (400) generates target code (401). The target code (401) is SQL code or object-oriented code. The target code (401) may be received by a validation framework (444) that can evaluate the target code (401) using a GT-based evaluation or a GT-free evaluation.

In embodiments where the target code (401) is evaluated by the validation framework (444) using GT-based evaluation, a large language model (440) is prompted with a GT-based prompt (404). The GT-based prompt (404) includes the target code (401), GT code, and instructions to evaluate the target code (401) based on the GT code. The instructions can include, for example, instructions to segment the target code (401) into target code chunks and the GT code into GT code chunks, map the target code chunks to corresponding GT code chunks based on predefined parameters or elements (for object-oriented code) or corresponding tables and attributes (for SQL code) for each target code chunk, evaluate the target code chunk based on the GT code chunk to yield a score (409), and determine one or more metrics (411) based on the scores (409). The instructions can further include instructions for outputting an analysis report (408) that includes the scores (409) on a chunk-by-chunk or line-by-line basis and the metrics (411) via, for example, a user device. The analysis report (408) and the metrics (411) can be used by a user for further evaluation or modification to the target code (401) to, for example, correct errors in the target code (401) as flagged by the analysis report (408).

In embodiments where the target code (401) is evaluated by the validation framework (444) using GT-free evaluation, the large language model (440) is prompted with a GT-free prompt (406). The GT-free prompt (406) includes the target code (401), contextual information including one or more evaluation criteria, reference evaluation of a prior-generated code including contextual information used to generate the prior-generated code and an evaluation of the prior-generated code, and instructions to evaluate the target code (401) based on the contextual information and the reference evaluation. The instructions can include, for example, instructions to segment the target code (401) into target code chunks, evaluate each target code chunk based on a corresponding evaluation criteria and the reference evaluation, generate feedback (410) for each target code chunk, and determine one or more metrics (411) based on the scores (409). The instructions can further include instructions for outputting the metrics (411) and the feedback (410) on a chunk-by-chunk or line-by-line basis when the score (409) for the corresponding target code chunk is less than a predetermined threshold (e.g., 100%) via a user device. In other words, the feedback (410) may only be shown to a user for target code that has a score (409) less than the predetermined threshold so as to provide targeted feedback for the user. Such targeted feedback enables a user to quickly correct errors in the target code (401) on a line-by-line basis with suggestions to correct the error provided in the feedback (410).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
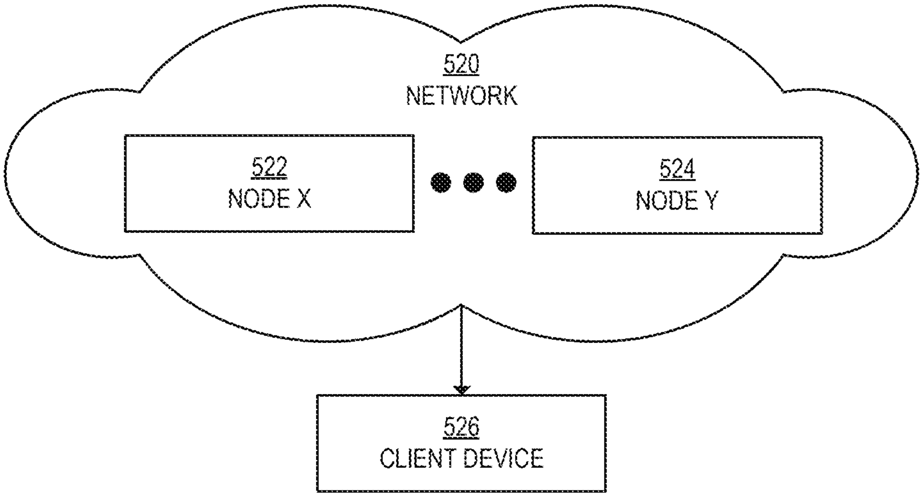

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

receiving, by a validation framework, structured query language (SQL) target code generated by a SQL code generator;

receiving, by the validation framework, ground truth SQL code; and prompting, by the validation framework, a large language model with the SQL target code, the ground truth SQL code, and instructions to automatically evaluate the SQL target code by performing operations comprising:

segmenting the SQL target code into a plurality of SQL target code chunks and the ground truth SQL code into a plurality of ground truth SQL code chunks, mapping each SQL target code chunk of the plurality of SQL target code chunks to corresponding ground truth SQL code chunks of the plurality of ground truth SQL code chunks, automatically evaluating each mapped SQL target code chunk of the plurality of SQL target code chunks based on the corresponding ground truth SQL code chunk of the plurality of ground truth SQL code chunks to yield a plurality of SQL scores, and determining a SQL metric for the SQL target code based on the plurality of SQL scores, wherein the large language model, when prompted, performs the operations to output the SQL metric.

2. The method of claim 1, wherein the SQL metric comprises a data-structure object.

3. The method of claim 1, wherein the SQL metric comprises at least one of a code accuracy, a code coverage, a primary-key accuracy, or a data-type accuracy.

4. The method of claim 1, wherein the SQL target code is a first SQL target code, and wherein the method further comprises:

receiving, by the validation framework, a second SQL target code generated by the SQL code generator;

receiving, by the validation framework, SQL contextual information comprising at least a plurality of SQL evaluation criteria and a reference SQL evaluation; and prompting, by the validation framework, the large language model with the second SQL target code, the SQL contextual information, the reference SQL evaluation, and instructions to evaluate the second SQL target code by performing operations comprising:

segmenting the second SQL target code into a plurality of second SQL target code chunks, evaluating each second SQL target code chunk of the plurality of second SQL target code chunks using a corresponding SQL evaluation criteria of the plurality of SQL evaluation criteria and the reference SQL evaluation to yield a second SQL score of a plurality of second SQL scores, generating feedback for each second SQL target code chunk of the plurality of second SQL target code chunks, and determining a second SQL metric for the second SQL target code based on the plurality of second SQL scores, wherein the large language model, when prompted, performs the operations to output the second SQL metric and the feedback.

5. The method of claim 4, wherein the reference SQL evaluation comprises a set of example SQL input and evaluation result output pairs, and wherein each SQL code chunk is further evaluated based on the set of example SQL input and the evaluation result output pairs.

6. The method of claim 1, further comprising:

receiving, by the validation framework, object-oriented target code generated by an object-oriented code generator;

receiving, by the validation framework, ground truth object-oriented code; and prompting the large language model with the object-oriented target code, the ground truth object-oriented code, and instructions to evaluate the object-oriented target code by performing operations comprising:

segmenting the object-oriented target code into a plurality of object-oriented target code chunks and the ground truth object-oriented code into a plurality of ground truth object-oriented code chunks, mapping each object-oriented target code chunk of the plurality of object-oriented target code chunks to corresponding ground truth object-oriented code chunks of the plurality of ground truth object-oriented code chunks, evaluating each mapped object-oriented target code chunk of the plurality of object-oriented target code chunks based on the corresponding ground truth object-oriented code chunk of the plurality of ground truth object-oriented code chunks to yield an object-oriented score of a plurality of object-oriented scores, and determining an object-oriented metric for the object-oriented target code based on the plurality of object-oriented scores, wherein the large language model, when prompted, performs the operations to output the object-oriented metric.

7. The method of claim 6, wherein the object-oriented metric comprises a data-structure object.

8. The method of claim 6, wherein the object-oriented metric comprises at least one of a code accuracy, a field-mapping accuracy, or a data-type accuracy.

9. A method comprising:

receiving, by a validation framework, target code generated by a code generator;

receiving, by the validation framework, contextual information comprising at least a plurality of evaluation criteria and a reference evaluation;

prompting by the validation framework, a large language model with the target code, the contextual information, the reference evaluation, and instructions to automatically evaluate the target code by performing operations comprising:

segmenting the target code into a plurality of target code chunks, automatically evaluating each target code chunk of the plurality of target code chunks using a corresponding evaluation criteria of the plurality of evaluation criteria and the reference evaluation to yield a score of a plurality of scores, generating feedback for each target code chunk of the plurality of target code chunks, and determining a metric for the target code based on the plurality of scores, wherein the large language model, when prompted, performs the operations to output the metric and the feedback; and displaying, by the validation framework, the feedback for each target code chunk when the metric is less than a predetermined threshold.

10. The method of claim 9, wherein the reference evaluation comprises a set of example target code input and evaluation output pairs, and wherein each target code chunk is further evaluated based on the set of example input and the evaluation output pairs.

11. The method of claim 9, wherein the feedback comprises at least a proposed code fix for a corresponding target code chunk of the plurality of target code chunks, a corresponding score for the corresponding target code chunk, and an explanation of the corresponding score.

12. The method of claim 9, wherein the target code is at least one of SQL code or object-oriented code.

13. A system comprising:

a computer processor;

a data repository in communication with the computer processor, wherein the data repository stores:

target code having a plurality of target code chunks, contextual information comprising at least a plurality of evaluation criteria and a reference evaluation, instructions, a plurality of scores, feedback, and a metric;

a large language model, when executed by the computer processor, performs operations to output the metric and the feedback, the operations comprising:

segmenting the target code into the plurality of target code chunks, automatically evaluating each target code chunk of the plurality of target code chunks using a corresponding evaluation criteria of the plurality of evaluation criteria and the reference evaluation to yield a score of the plurality of scores, generating the feedback for each target code chunk of the plurality of target code chunks, and determining the metric for the target code based on the plurality of scores; and a validation framework, when executed by the computer processor:

receives the target code, prompts the large language model with the target code, the contextual information, the reference evaluation, and the instructions to automatically evaluate the target code by performing operations, and displays the feedback for each target code chunk when the metric is less than a predetermined threshold.

14. The system of claim 13, wherein the target code is a SQL target code having a plurality of SQL target code chunks, the contextual information is a SQL contextual information, the plurality of evaluation criteria is a plurality of SQL evaluation criteria, and the reference evaluation is a SQL reference evaluation, the plurality of scores is a plurality of SQL scores, and the metric is a SQL metric.

15. The system of claim 13, wherein the target code is an object-oriented target code having a plurality of object-oriented target code chunks, the contextual information is an object-oriented contextual information, the plurality of evaluation criteria is a plurality of object-oriented evaluation criteria, and the reference evaluation is an object-oriented reference evaluation, the plurality of scores is a plurality of object-oriented scores, and the metric is a object-oriented metric.

16. The system of claim 13, wherein the reference evaluation comprises a set of example target code input and evaluation output pairs, and wherein each target code chunk is further evaluated based on the set of example input and the evaluation output pairs.

17. The system of claim 13, wherein the feedback comprises at least a proposed code fix for a corresponding target code chunk of the plurality of target code chunks, a corresponding score for the corresponding target code chunk, and an explanation of the corresponding score.

18. The system of claim 13, wherein the metric is a first metric, the plurality of scores is a first plurality of scores, and wherein the large language model, when further executed by the computer processor, performs operations to output a second metric, the operations further comprising:

segmenting the target code into the plurality of target code chunks and a ground truth code into a plurality of ground truth code chunks, mapping each target code chunk of the plurality of target code chunks to corresponding ground truth code chunks of the plurality of ground truth code chunks, evaluating each mapped target code chunk of the plurality of target code chunks based on the corresponding ground truth code chunk of the plurality of ground truth code chunks to yield the second plurality of scores, and determining a second metric for the target code based on the second plurality of scores, wherein the large language model, when prompted, performs the operations to output the second metric.

19. The system of claim 18, wherein the target code is a SQL target code having a plurality of SQL target code chunks, the ground truth code is a SQL ground truth code having a plurality of SQL ground truth code chunks, the second plurality of scores is a plurality of SQL scores, and the second metric is a SQL metric.

20. The system of claim 18, wherein the target code is an object-oriented target code having a plurality of object-oriented target code chunks, the ground truth code is an object-oriented ground truth code having a plurality of object-oriented ground truth code chunks, the second plurality of scores is a plurality of object-oriented scores, and the second metric is a object-oriented metric.

* * * * *